ALPHEUS C. FORD, OF LYNN, ASSIGNOR TO HIMSELF AND ROBERT B. SWISHER, OF SPRINGVILLE, PENNSYLVANIA, AND WILLIAM C. LARZELAIR, OF BLAIRSTOWN, NEW JERSEY.

Letters Patent No. 90,438, dated May 25, 1869.

IMPROVED COMPOSITION FOR CLEANING MARBLE, STONE, &c.

The Schedule referred to in these Letters Patent and making part of the same.

*To all whom it may concern:*

Be it known that I, ALPHEUS C. FORD, of Lynn, in the county of Susquehanna, and State of Pennsylvania, have invented a new and improved Composition for Cleaning Marble, Stone, &c.; and I do hereby declare that the following is a full, clear, and exact description thereof, which will enable others skilled in the art to make and use the same.

My invention has for its object to furnish a simple and effective composition for cleaning tombstones and other marble and stone articles, which shall be readily prepared and applied, and which will be effective in use; and It consists of the composition, prepared of the ingredients and in the proportions and manner hereinafter more fully described.

In preparing this composition, I put one-half of an ounce of sheet-zinc into five pounds of muriatic acid. When the bubbling caused by the combination of the acid and zinc has ceased, I add one ounce of sal-ammoniac and one-half of an ounce of alum.

I then dilute the mixture by the addition of one quart of soft water, and the composition is ready for use.

In using this composition, I first pour water upon the marble or stone to be cleaned, and then apply the composition, using a scrubbing-brush to remove dirt from the letters, engravings, &c.

The surface of the marble is then smoothed with pumice-stone, rinsed with water, and again brushed.

A small portion of the composition, diluted with water, in the proportion of two parts of water to one part of the composition, is then poured over the marble, to give it a gloss, and the marble is again rinsed with water.

Having thus described my invention,

I claim as new, and desire to secure by Letters Patent—

An improved composition for cleaning marble, stone, &c., formed of the ingredients and in the proportions and manner substantially as herein described and set forth.

ALPHEUS C. FORD.

Witnesses:
D. W. CAMP,
W. W. PRICHARD.